US012009650B1

(12) United States Patent
Wall, II

(10) Patent No.: US 12,009,650 B1
(45) Date of Patent: Jun. 11, 2024

(54) APPARATUS FOR AN ELECTRIC FEEDTHROUGH FOR HIGH TEMPERATURE, HIGH PRESSURE, AND HIGHLY CORROSIVE ENVIRONMENTS

(71) Applicant: First Ammonia Motors, Inc., New York, NY (US)

(72) Inventor: James L. Wall, II, Concord, NC (US)

(73) Assignee: First Ammonia Motors, Inc., New York, NY (US)

( * ) Notice: Subject to any disclaimer, the term of this patent is extended or adjusted under 35 U.S.C. 154(b) by 0 days.

(21) Appl. No.: 18/388,296

(22) Filed: Nov. 9, 2023

(51) Int. Cl.
*H02G 3/22* (2006.01)
*F16L 5/10* (2006.01)
*H01B 17/26* (2006.01)

(52) U.S. Cl.
CPC ............... *H02G 3/22* (2013.01); *F16L 5/10* (2013.01); *H01B 17/26* (2013.01)

(58) Field of Classification Search
CPC .. H02G 3/22; H02G 3/24; H02G 3/26; H02G 3/30; H02G 3/34; H02G 15/025; F16L 5/10; F16L 5/00; F16L 5/02; H01B 17/26; H01B 17/00; H01B 17/005; H01B 17/265; A61N 1/375; A61N 1/3754; A61N 1/3756; A61N 1/3758
USPC ... 174/650, 520, 652, 656, 260, 262, 138 R, 174/77 R; 361/302, 306.1, 600, 601; 333/182; 277/590, 602, 621, 620
See application file for complete search history.

(56) References Cited

U.S. PATENT DOCUMENTS

| | | | | |
|---|---|---|---|---|
| 3,055,972 | A * | 9/1962 | Peterson | H02G 3/0658 174/77 R |
| 4,611,093 | A * | 9/1986 | Farmer | H01F 27/04 411/389 |
| 4,791,247 | A * | 12/1988 | Cacalloro | H01B 17/22 156/330 |
| 4,982,055 | A * | 1/1991 | Pollack | H01R 13/523 439/551 |
| 5,867,361 | A * | 2/1999 | Wolf | A61N 1/3754 333/182 |
| 8,901,440 | B2 * | 12/2014 | Rousseau | H01R 13/523 174/650 |

* cited by examiner

*Primary Examiner* — Angel R Estrada

(57) ABSTRACT

The present invention relates, in general, to an apparatus for an electrical power feedthrough suitable for use in high temperature, high pressure, and/or corrosive environments, such as, for example, within ammonia cracking (i.e., dissociation) systems. The present invention is fabricated from conductive nickel alloys which have high melting temperatures, and which are resistant to corrosion at high temperatures, as well as non-conductive ceramic materials which provide electrical insulation between the systems that feedthrough is coupled to.

20 Claims, 6 Drawing Sheets

APPARATUS FOR AN ELECTRIC FEEDTHROUGH FOR HIGH TEMPERATURE, HIGH PRESSURE, AND HIGHLY CORROSIVE ENVIRONMENTS

BACKGROUND

Field of the Invention

The present invention relates, in general, to an apparatus for an electrical power feedthrough suitable for use in high temperature, high pressure, and/or corrosive environments, such as, for example, within ammonia cracking (i.e., dissociation) systems.

Description of Related Art

Electric powered catalyst units, also referred to as catalytic converters, are well known in the prior art. These catalyst units generally have a metallic conductor, through which a current is passed, and which is connected to a voltage source via an electrical contact. Since these catalyst units are designed to be gas-tight, special electric feedthroughs are needed to carry electric current through the housing of the catalyst unit in order to provide electric power to components within the catalyst unit.

Such electric feedthroughs typically consist of an current conductor, which are embedded in an insulating, non-conductive material, such as ceramic. The insulating material can in turn be surrounded by a metal sleeve, which through a variety of known techniques, can be connected to the housing of the catalyst unit in a manner that mitigates mechanical stress. The electric feedthroughs, as known in the prior art, usually have a central current conductor, for example a stud, pin, or bolt, an insulating material surrounding the conductor, and an outer metal sleeve.

A disadvantage of known electric feedthroughs is that they are susceptible to failure in environments where the temperature (i.e., thermal load) and/or pressure is too high. Operation in such environments can lead to damage, degradation, and ultimate failure of these known electric feedthrough devices. Furthermore, in high vibration environments, such as in a vehicle with an internal combustion engine, electric feedthroughs are subject to significant mechanical stress which can also lead to failure. Known electric feedthroughs are not typically rated for use in environments having a temperature above 600° C.

In addition, known electric feedthroughs are subject to failure when used in corrosive environments, such as those with heated ammonia, hydrogen, and nitrogen, for example. Heated ammonia is known to be especially corrosive, and is characterized by its ability to attack and damage many materials, including steel, stainless steel, copper, brass, aluminum, rubbers, and plastics. Heated ammonia is more corrosive than mere gaseous ammonia as heating ammonia causes it to evaporate and form a high concentration of ammonia gas in a confined space, such as within a pressurized electric catalyst unit housing. This high concentration of ammonia gas results in a rapid and extreme chemical attack on metal surfaces, thereby damaging components of the electric feedthrough assemblies that come into contact the ammonia gas.

Similarly, metals exposed to hydrogen at high temperatures can experience internal decarburization and weakening, which can lead to blistering, cracking, and loss of tensile ductility, all of which can ultimately result in a failure of the electric feedthrough.

Furthermore, when known electric feedthroughs are exposed to high temperatures which are significantly higher than those at which its components were assembled, these components expand by different amounts due to differences in coefficient of thermal expansion. If not properly managed, the different rates of expansion for these components, typically made from different materials, can induce stress within the electric feedthrough assemblies, oftentimes leading to device failure and/or the seals at the housing through which the electric feedthroughs are inserted.

Therefore, there is a need for an electric feedthrough assembly that can be used to supply power to an electric catalyst unit on-board a vehicle having an internal combustion, and which addresses the aforementioned challenges and drawbacks of known electric feedthroughs which are subject to failure during operation in high temperature, high pressure, and/or highly corrosive environments.

SUMMARY

In an embodiment, the present invention is directed to an electric feedthrough for conducting electric currents, comprising: a pass-thru stud having a seat located between first and second threaded distal ends; a first pair of nickel alloy washers disposed between a first pair of threaded nuts disposed on the first threaded distal end of the pass-thru stud; a plug disposed on the pass-thru stud, the plug having an aperture and a threaded portion; an insulating sleeve disposed within the aperture; a counterbore washer disposed on the pass-thru stud adjacent to the threaded portion of the plug; a second pair of nickel alloy washers disposed on the pass-thru stud and located within the counterbore washer; a first ceramic washer disposed on the pass-thru stud between the counterbore washer and the seat; a third pair of nickel alloy washers disposed between a second pair of threaded nuts disposed on the second threaded distal end of the pass-thru stud; a second ceramic washer disposed on the pass-thru stud between a pair of metallic washers; and a body disposed on the pass-thru stud, the body covering the second ceramic washer, the pair of metallic washers, the seat of the pass-thru stud, the first ceramic washer, the counterbore washer, and the second pair of nickel allow washers, wherein the body has internal threading which couples to the threaded portion of the plug.

In another embodiment, the present invention is directed to an electric feedthrough for conducting electric currents in a high temperature, high pressure, and highly corrosive environment, comprising: a pass-thru stud having a seat with a first face and a second face; a first ceramic washer disposed on the pass-thru stud adjacent the first face of the seat; a counterbore washer disposed on the pass-thru stud adjacent the ceramic washer; a pair of Inconel® washers located within the counterbore washer; a plug disposed on the pass-through stud adjacent to the counterbore washer, the plug having a threaded portion; a second ceramic washer located between a pair of metallic washers disposed on the pass-thru stud adjacent the second face of the seat; and a body having internal threading, the internal threading capable of coupling to the threaded portion of the plug.

In yet another embodiment, the present invention is directed to an electric feedthrough for conducting electric currents in a high temperature, high pressure, and highly corrosive environment, comprising: a pass-thru stud having a seat with a first face and a second face; a first ceramic washer disposed on the pass-thru stud adjacent the first face of the seat; a counterbore washer disposed on the pass-thru stud adjacent the ceramic washer; a pair of Inconel® washers located within the counterbore washer; a plug disposed on the pass-through stud adjacent to the counterbore washer, the plug having a threaded portion; a second ceramic washer located between a pair of silver washers disposed on the pass-thru stud adjacent the second face of the seat; a body having internal threading, the internal threading capable of coupling to the threaded portion of the plug.

BRIEF DESCRIPTION OF THE DRAWINGS

These and other embodiments of the present invention will be discussed with reference to the following exemplary and non-limiting illustrations, in which like elements are numbered similarly, and where.

DEFINITIONS

Figure 1:
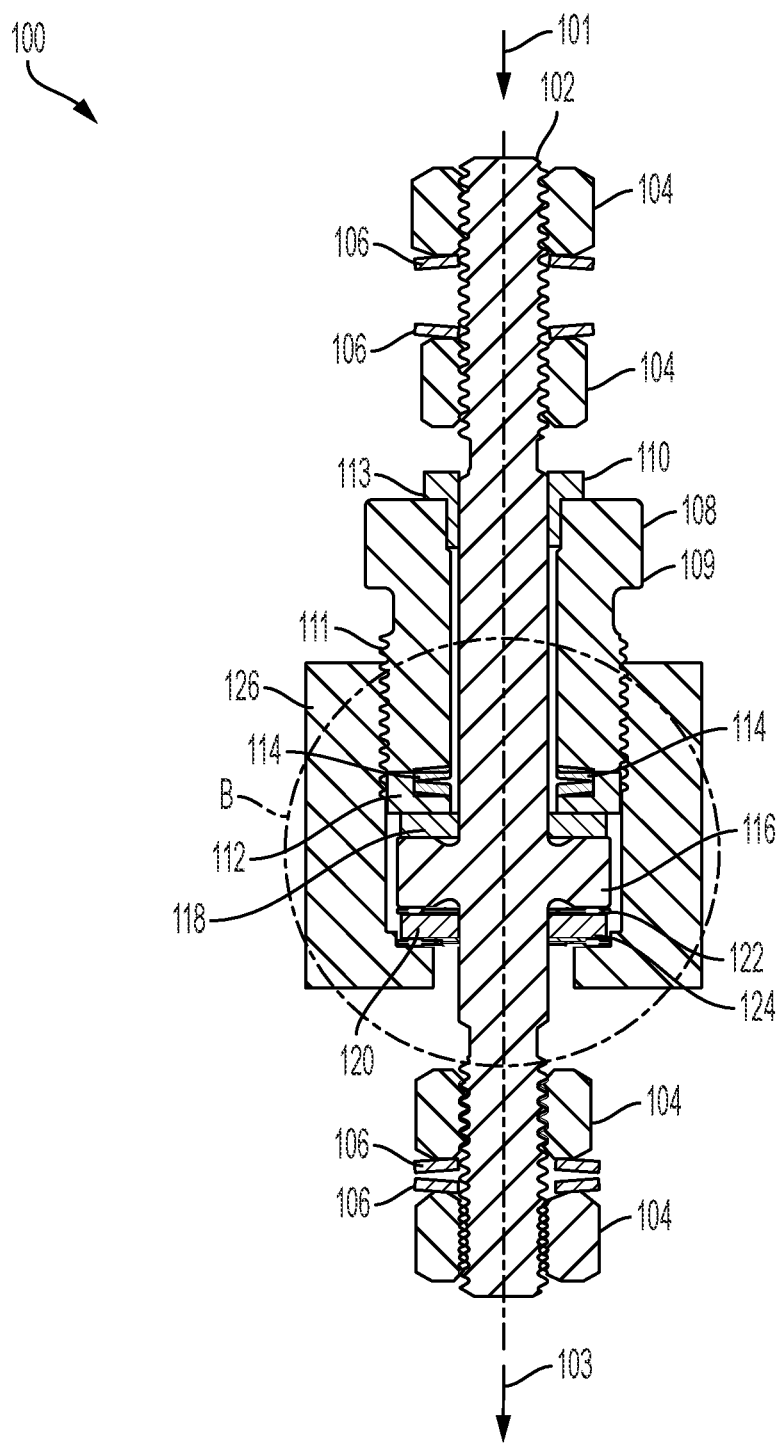
FIG. 1 is a cross-sectional view of an electric feedthrough assembly, according to an embodiment of the present invention.

The following definitions are meant to aid in the description and understanding of the defined terms in the context of the present invention. The definitions are not meant to limit these terms to less than is described throughout this specification. Such definitions are meant to encompass grammatical equivalents.

As used herein, the term "vehicle" refers to any moving vehicle that is capable of carrying one or more human occupants and/or cargo, or which is capable of performing a task, and which is powered by any form of energy. The term "vehicle" includes, but is not limited to:

(a) motor vehicles such as cars, trucks, vans, minivans, sport utility vehicles, passenger carrying vehicles, goods carrying vehicles, 2-, 3-, and 4-wheeled vehicles, quadricycles, motorcycles, scooters, all-terrain vehicles, utility task vehicles, and the like; (b) airborne vehicles such as helicopters, airplanes, airships, drones, aerospace vehicles, and the like; (c) marine vessels such as dry cargo ships, liquid cargo ships, specialized cargo ships, tug-boats, cruise ships, recreational boats, fishing boats, personal watercraft, jet skis, and the like; (d) locomotives; and (e) heavy equipment and machinery, power generators, lawnmowers and tractors, agricultural equipment and machinery, forestry equipment and machinery, construction equipment and machinery, mining equipment and machinery, and the like.

As used herein, the term "internal combustion engine" refers to any engine, spark ignition gasoline engine, compression ignition diesel engine, rotary, reciprocating, or other engine wherein combustion takes place in a combustion chamber, such that the products of combustion, together with any other by-products, perform work by exerting force on a moving surface from which the mechanical output is obtained from the engine. The term "internal combustion engine" includes, but is not limited to, hybrid internal combustion engines, two-stroke engines, four-stroke engines, six-stroke engines, and the like.

As used herein, the term "catalyst" refers to a material that promotes a chemical reaction. The term "catalyst" includes, but is not limited to, a catalyst or catalysts capable of promoting cracking reactions, such as ammonia cracking reactions, whether used as base catalyst(s) and/or additive catalyst(s). The catalyst, for the purposes of the present invention, can include, but is not limited to, a non-stoichiometric lithium imide, nickel, iron, cobalt, iron cobalt, ruthenium, vanadium, palladium, rhodium, platinum, sodium amide, and the like, as well as various combinations thereof.

As used herein, the term "cracking" refers to a process or processes by which ammonia is dissociated and/or decomposed into constituent hydrogen and nitrogen components over at least one catalyst.

As used herein, the term "nickel alloy" refers to pure nickel or an alloy containing nickel as a main component. The term "nickel alloy" includes, but is not limited to, Inconel®, such as, for example, Inconel® 625, Inconel® 718, Inconel® 725, and other compound metals having nickel as a main component. Inconel® is the trademark of Special Metals Corporation of Huntington, West Virginia, and is an alloy of nickel containing chromium and iron, and which is resistant to corrosion at high temperatures.

As used herein, the term "ceramic" refers to silicon nitride ceramic, steatite, and other non-conductive ceramic materials.

As used herein, the terms "seal", "sealed", and "sealing" refer to protection from harmful effects of ambient environmental conditions. Such protection includes protection against differences in pressure, temperature, fluid/humidity, electrical potential, shock, and gaseous compositions. These terms also refer to a hermetic, vacuum, air-tight, and/or gas-tight environment within a housing, such as within a pressure vessel.

DETAILED DESCRIPTION

It should be understood that aspects of the present invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the present invention is described with respect to its application for an electric catalyst unit utilized on-board a motor vehicle, it is understood that the electric feedthrough assembly of the present invention can be implemented in any high pressure, high temperature, and/or corrosive setting where electricity needs to be supplied into a sealed environment. Such applications of the present invention include, but are not limited to, downhole, wellbore, sub-sea, medical device, aeronautics, extraterrestrial, nuclear power, mining, and industrial fabrication (i.e., vacuum furnaces, sample heating, in-vacuum coating, electron beam evaporation, plasma sputtering, etc.) technologies.

FIG. 1 is a cross-sectional view of an electric feedthrough assembly 100, according to an embodiment of the present invention. The electric feedthrough 100 comprises a pass-thru stud 102, which conducts electricity between an external power source 101 and a power consuming device 103 located within a sealed environment.

In an embodiment, the pass-thru stud 102 has a high electrical rating and a low resistance due to its relatively large cross-sectional contact area. The pass-thru stud 102 is made from a highly conductive material, such as, but not limited to, Inconel®, copper, iron, gold, aluminum, silver, and combinations thereof.

In an embodiment, each distal end of the pass-thru stud 102 has a threaded surface, where each distal end accepts complimentary threaded nuts 104, which are preferably in the form of hexagonal ("hex") nuts. In another embodiment, the threaded nuts 104 are in the form of square nuts or round nuts. A pair of threaded nuts 104 are secured to each respective distal end of the pass-thru stud 102 as shown in FIG. 1. In an embodiment, the threaded nuts 104 are made from a nickel alloy, and in a preferred embodiment, the threaded nuts 104 are made from Inconel®.

Between each pair of threaded nuts 104, opposing washers 106 are secured to each respective threaded distal end of the pass-thru stud 102. In an embodiment, the washers 106 are made from a nickel alloy. In a preferred embodiment, the washers 106 are made from a nickel alloy, and in a preferred embodiment, the washers 106 are made from Inconel®.

Each pair of threaded nuts 104 and opposing washer 106 assembly secures a respective end of a conductor between respective opposing washers 106. For example, one pair of opposing washers 106 can secure an end of a conductor that supplies current from an external voltage source, while the other pair of opposing washers 106 can secure an end of a conductor used to deliver the current to an application, such as a heating element.

A plug 108 is disposed between the respective pair of threaded nuts 104, as shown in FIG. 1. In an embodiment, the plug 108 is a unified extra fine thread ("UNEF") plug with a diameter of 0.875 inches. The plug 108 has a counterbore flange 109 and a threaded portion 111.

An electrical insulating sleeve 110 is disposed within an aperture 113 on the plug 108. In an embodiment, the sleeve 110 is made from a ceramic material that is non-conductive and has electrically insulative properties, and which has high mechanical strength that provides wear resistance, and which is resistant to corrosion at high temperatures.

A counterbore washer 112 is disposed adjacent to the threaded portion 111 of the plug 108. The counterbore washer 112 includes a recessed seat. In an embodiment, the counterbore washer 112 is from a nickel alloy, and in a preferred embodiment, the counterbore washer 112 is made from Inconel®.

At least two washers 114 are received by, and sit within, the recessed seat of the counterbore washer 112. In an embodiment, the washers 114 are made from a nickel alloy. In a preferred embodiment, the washers 114 are made from Inconel®.

The present invention improves over known prior art electric feedthroughs as the materials utilized for the various components are selected due to their increased temperature, pressure, and corrosion resistance properties. Specifically, the washers 106 and 114 are preferably made from Inconel®. Inconel® has a melting point of 1390 to 1425° C., which is significantly higher than the melting points of zinc (420° C.), aluminum (660° C.), brass (930° C.), copper (1084° C.). The aforementioned metals are typically utilized in known electric feedthroughs.

In other embodiments, the washers 106, 114 are made from carbon steel, stainless steel, molybdenum, titanium, cobalt, iridium, and/or tungsten, all of which have high melting points.

Disposed on a side of the counterbore washer 112 opposite the plug 108 is a ceramic washer 118. The ceramic washer 118 is a non-conductive electrical insulator. In an embodiment, the ceramic washer 118 is made from silicon nitride. In another embodiment, the ceramic washer 118 is made from a material which is non-conductive and have electrically insulative properties.

Disposed on a side of a seat 116 opposite the counterbore washer 112 and plug 108 is another ceramic washer 120 surrounded by a silver washers 122, 124, each of which has raised sealing rings on both sides. In an embodiment, the silver washers 122, 124 each have the same properties and dimensions. In another embodiment, the silver washers 122, 124 have different properties and dimensions, such as, for example, different internal diameters, thicknesses, heights of the raised sealing ring wall, and the like.

A body 126 is disposed such that it surrounds a majority of the threaded portion 111 of the plug 108, as well as the counterbore washer 112, washers 114, seat 116, ceramic washers 118, 120, and silver washers 122, 124.

Figure 2:
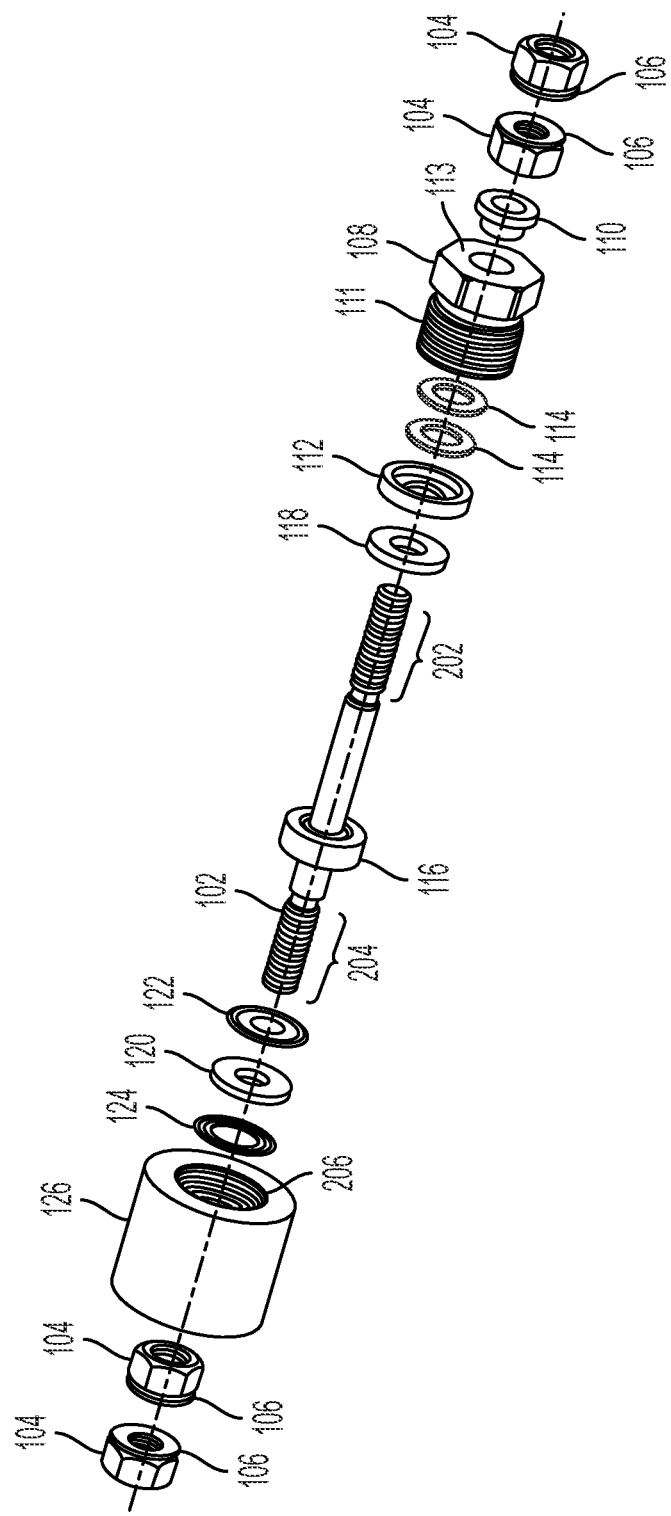
FIG. 2 is an exploded view of the electric feedthrough assembly, according to an embodiment of the present invention.

FIG. 2 is an exploded view of the electric feedthrough assembly 100, according to an embodiment of the present invention. As can be seen in FIG. 2, the pass-thru stud 102 has threaded distal ends 202, 204, and the body 126 has a threaded internal surface 206.

Figure 3:
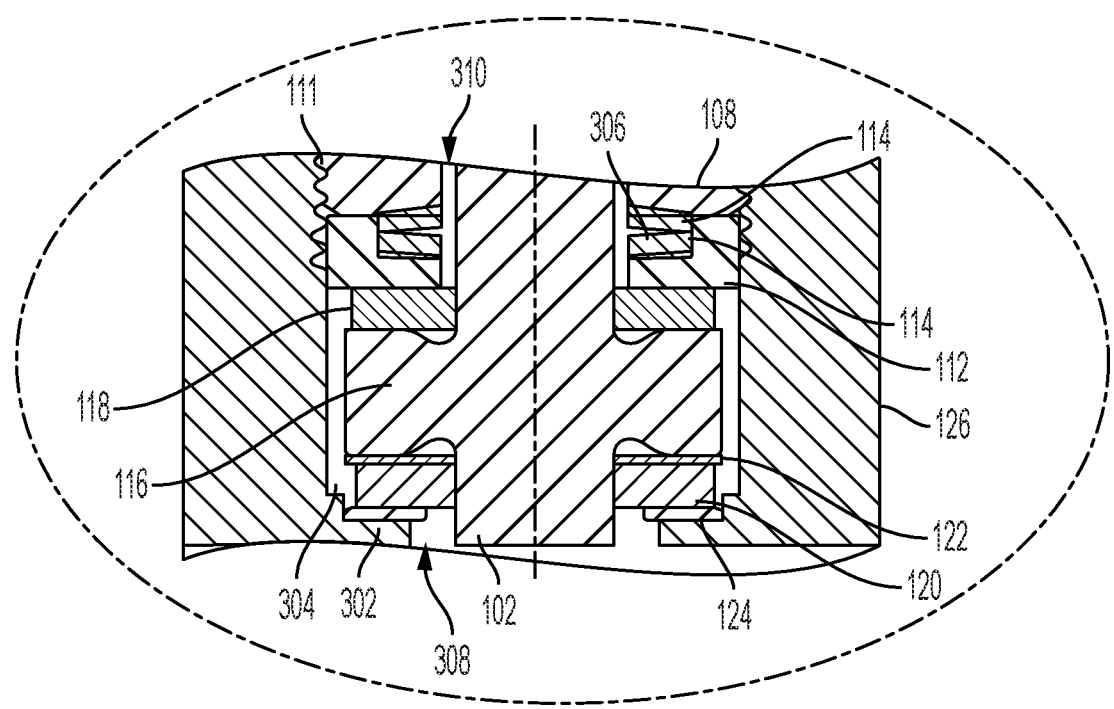
FIG. 3 is a cross-sectional view of a seat of a pass-thru stud of the electric feedthrough assembly, according to an embodiment of the present invention.

FIG. 3 is a cross-sectional view of the seat 116 of the pass-thru stud 102 of the electric feedthrough assembly 100, according to an embodiment of the present invention. As can be seen in FIG. 3, the body 126 further includes a flange 302 on which the ceramic washer 120 and silver washers 122, 124 are disposed on, and which provide a sealing portion between the gap 304 and opening 308. On an opposite side of the seat 116 of the pass-thru stud 102 from the flange 302, the plug 108, counterbore washer 112, washers 114, and ceramic washer 118 provide a sealing portion between the gap 304 and opening 310.

In addition, the washers 114 are disposed within the counterbore washer 112 in such a manner that a compressible void 306 is created between the washers 114.

In another embodiment, the washers 122, 124 can be made from vermiculite, such as, for example, Thermiculite®, a high-temperature, sealing material comprised of chemically exfoliated and thermally exfoliated vermiculite. Thermiculite® is a trademark of Flexitallic Group of Houston, Texas. The use of vermiculite for the washers 122, 124 can be beneficial in a higher temperature-rated environments of up to 1,000° C., which is above the melting point of silver at approximately 960° C.

Figure 4:
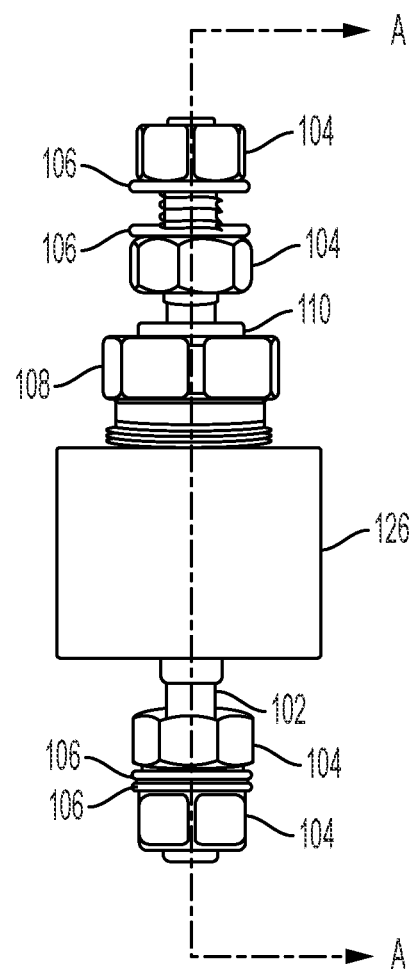
FIG. 4 is a perspective view of the electric feedthrough assembly, according to an embodiment of the present invention.

FIG. 4 is a perspective view of the electric feedthrough assembly 100, according to an embodiment of the present invention.

Figure 5:
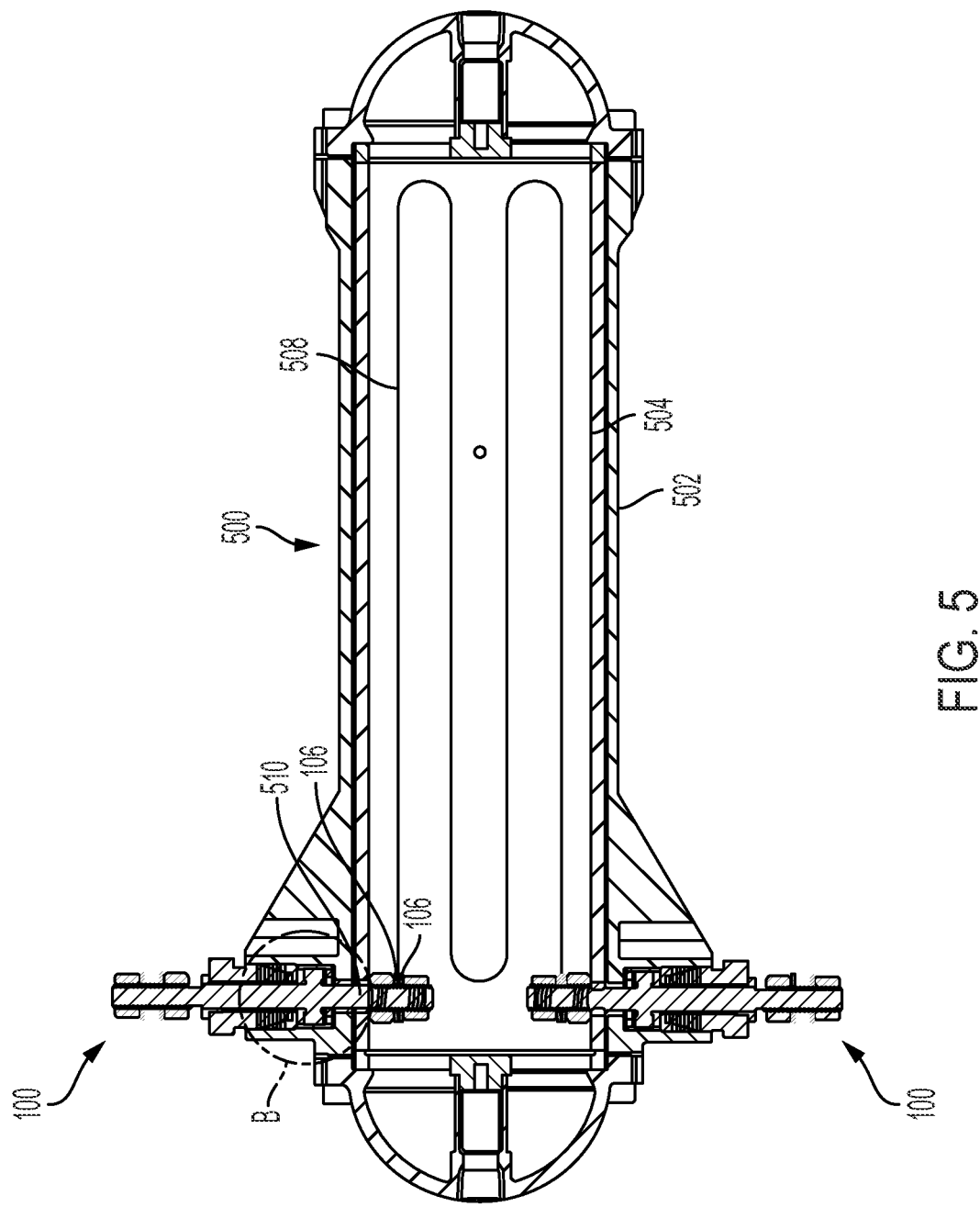
FIG. 5 is a cross-sectional view of an electric catalyst unit incorporating electric feedthrough assemblies, according to an embodiment of the present invention.

FIG. 5 is a cross-sectional view of an electric catalyst unit 500 incorporating electric feedthrough assemblies 100, according to an embodiment of the present invention. The electric catalyst unit 500 is described in commonly owned U.S. patent application Ser. No. 18/241,328 filed on Sep. 1, 2023, entitled "SYSTEMS AND METHODS FOR THE CATALYTIC PRODUCTION OF HYDROGEN FROM AMMONIA ON-BOARD MOTOR VEHICLES", which is incorporated by reference herein.

The electric catalyst unit 500 includes a housing 502, as well as a sleeve 504, such as a ceramic insulating sleeve, all of which form a pressure vessel. The housing 502 further includes fittings 506 which are configured to receive respective electric feedthrough assemblies 100. The fittings 506 form respective apertures 510 in which the electric feedthrough assemblies 100 can be guided into the interior of the electric catalyst unit 500.

In an embodiment, each electric feedthrough assembly 100 is coupled to its respective fitting 506 in a manner resistant to mechanical stress. The coupling can be made via welding the electric feedthrough assembly 100 to the fitting 506 in a permanent, or semi-permanent manner.

In another embodiment, the electric feedthrough can be removably coupled to the fitting 506, such that different electric feedthroughs can be interchangeably utilized with the fitting 506. In this embodiment, the coupling can be made via a press-fit, mechanical interlocking, or other similar mechanism which allows the electric feedthrough assembly 100 to seal the aperture 510 upon installation, but which also allows the electric feedthrough assembly 100 to be removed from the fitting 510.

A conductor, such as a heating element 508, is disposed within the electric catalyst unit 500. The heating element 508 can be an air process heater, a cartridge heater, a tubular heater, a band heater, a strip heater, an etched foil heater (or a thin-film heater), a ceramic fiber heater, a resistance wire, and the like. Respective ends of the heating element 508 are in contact with the electric feedthrough assemblies 100, as shown in FIG. 5. The electric feedthrough assemblies 100 provide electricity from the external power source 101 for energizing or heating the heating element 508.

In an embodiment, each electric feedthrough assembly 100 secures a respective end of the heating element 508 between opposing washers 106. In another embodiment, the respective ends of the heating element 508 are secured in contact with the electric power-feed through 100 through a variety of means, including, but not limited to, welding, clamping, clinching, folding, wrapping, and the like.

The electric catalyst unit 500 includes a catalyst, such as discrete catalyst media, disposed within its interior. In another embodiment, the catalyst can be coated on the interior walls and surfaces of the electric catalyst unit 500, and/or onto the surfaces of the heating element 508, using a washcoating or deposition technique to bind or adhere the catalyst to these surfaces.

In an embodiment, the electric catalyst unit 500 receives gaseous ammonia from a heat-exchange catalyst unit (not shown). Electrical current from the external power source 101 is passed to the heating element 508 via the electric feedthrough assemblies 100, thereby energizing and heating the heating element 508 to a threshold temperature suitable to heat the catalyst and thereby perform the ammonia cracking process. The threshold temperature can range from 400° C. to 700° C., and in a preferred embodiment, the threshold temperature is at least 600° C.

Figure 6:
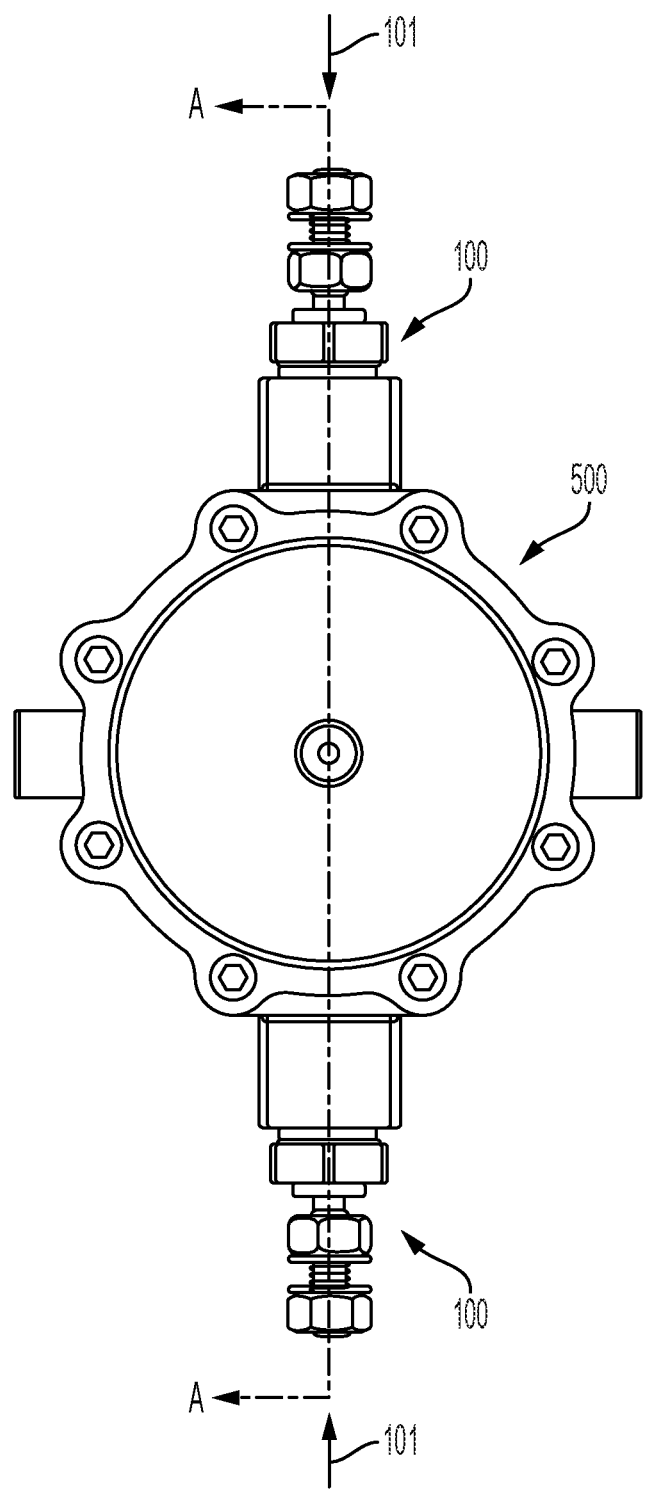
FIG. 6 is a perspective view of the electric catalyst unit incorporating electric feedthrough assemblies, according to an embodiment of the present invention.

FIG. 6 is a perspective view of the electric catalyst unit 500 incorporating electric feedthrough assemblies 100, according to an embodiment of the present invention. In an embodiment, two electric feedthrough assemblies 100 are utilized. However, the present invention is not limited to the depicted construction, and multiple electric feedthrough assemblies 100 can be utilized based on the required power capacity for the heating element.

The invention claimed is:

1. An electric feedthrough for conducting electric currents, comprising:
 a pass-thru stud having a seat located between first and second threaded distal ends;
 a first pair of nickel alloy washers disposed between a first pair of threaded nuts disposed on the first threaded distal end of the pass-thru stud;
 a plug disposed on the pass-thru stud, the plug having an aperture and a threaded portion;
 an insulating sleeve disposed within the aperture;
 a counterbore washer disposed on the pass-thru stud adjacent to the threaded portion of the plug;
 a second pair of nickel alloy washers disposed on the pass-thru stud and located within the counterbore washer;
 a first ceramic washer disposed on the pass-thru stud between the counterbore washer and the seat;
 a third pair of nickel alloy washers disposed between a second pair of threaded nuts disposed on the second threaded distal end of the pass-thru stud;
 a second ceramic washer disposed on the pass-thru stud between a pair of metallic washers; and
 a body disposed on the pass-thru stud, the body covering the second ceramic washer, the pair of metallic washers, the seat of the pass-thru stud, the first ceramic washer, the counterbore washer, and the second pair of nickel allow washers, wherein the body has internal threading which couples to the threaded portion of the plug.

2. The electric feedthrough of claim 1, wherein the first and second pair of nickel alloy washers are made from an alloy of nickel containing chromium and iron.

3. The electric feedthrough of claim 1, wherein the pair of metallic washers are made from silver.

4. The electric feedthrough of claim 1, wherein the pair of metallic washers are made from vermiculite.

5. The electric feedthrough of claim 1, wherein the second threaded distal end of the pass-thru stud is capable of insertion into an aperture of a pressure vessel.

6. The electric feedthrough of claim 1, wherein a conductor delivering current from an external power source is secured between the first pair of nickel alloy washers.

7. The electric feedthrough of claim 1, wherein the first and second ceramic washers are made from silicon nitride.

8. The electric feedthrough of claim 5, wherein the pressure vessel is an electric catalyst unit.

9. An electric feedthrough for conducting electric currents in a high temperature, high pressure, and highly corrosive environment, comprising:
 a pass-thru stud having a seat with a first face and a second face;
 a first ceramic washer disposed on the pass-thru stud adjacent the first face of the seat;
 a counterbore washer disposed on the pass-thru stud adjacent the ceramic washer;
 a pair of washers made from an alloy of nickel containing chromium and iron located within the counterbore washer;
 a plug disposed on the pass-through stud adjacent to the counterbore washer, the plug having a threaded portion;
 a second ceramic washer located between a pair of metallic washers disposed on the pass-thru stud adjacent the second face of the seat; and
 a body having internal threading, the internal threading capable of coupling to the threaded portion of the plug.

10. The electric feedthrough of claim 9, wherein the pair of metallic washers are made from silver.

11. The electric feedthrough of claim 9, wherein the pair of metallic washers are made from vermiculite.

12. The electric feedthrough of claim 9, wherein a sealed environment is formed when the internal threading of the body is coupled to the threaded portion of the plug.

13. The electric feedthrough of claim 9, wherein the pass-thru stud further comprises first and second distal ends, the first and second distal ends each capable of coupling to a conductor.

14. The electric feedthrough of claim 9, wherein the pass-thru stud is capable of insertion into an aperture of a pressure vessel.

15. The electric feedthrough of claim 14, wherein the pressure vessel is an electric catalyst unit.

16. An electric feedthrough for conducting electric currents in a high temperature, high pressure, and highly corrosive environment, comprising:
   a pass-thru stud having a seat with a first face and a second face;
   a first ceramic washer disposed on the pass-thru stud adjacent the first face of the seat;
   a counterbore washer disposed on the pass-thru stud adjacent the ceramic washer;
   a pair of washers made from an alloy of nickel containing chromium and iron located within the counterbore washer;
   a plug disposed on the pass-through stud adjacent to the counterbore washer, the plug having a threaded portion;
   a second ceramic washer located between a pair of silver washers disposed on the pass-thru stud adjacent the second face of the seat; and
   a body having internal threading, the internal threading capable of coupling to the threaded portion of the plug.

17. The electric feedthrough of claim 16, wherein a sealed environment is formed when the internal threading of the body is coupled to the threaded portion of the plug.

18. The electric feedthrough of claim 16, wherein the pass-thru stud further comprises first and second distal ends, the first and second distal ends each capable of coupling to a conductor.

19. The electric feedthrough of claim 16, wherein the pass-thru stud is capable of insertion into an aperture of a pressure vessel.

20. The electric feedthrough of claim 19, wherein the pressure vessel is an electric catalyst unit.

* * * * *